(12) United States Patent
Menapace et al.

(10) Patent No.: US 6,920,765 B2
(45) Date of Patent: Jul. 26, 2005

(54) COMBINED ADVANCED FINISHING AND UV LASER CONDITIONING PROCESS FOR PRODUCING DAMAGE RESISTANT OPTICS

(75) Inventors: Joseph A. Menapace, Livermore, CA (US); John E. Peterson, Livermore, CA (US); Bernardino M. Penetrante, San Ramon, CA (US); Philip E. Miller, Livermore, CA (US); Thomas G. Parham, Livermore, CA (US); Michael A. Nichols, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 283 days.

(21) Appl. No.: 10/125,851

(22) Filed: Apr. 17, 2002

(65) Prior Publication Data

US 2002/0185611 A1 Dec. 12, 2002

Related U.S. Application Data

(60) Provisional application No. 60/295,873, filed on Jun. 4, 2001.

(51) Int. Cl.$^7$ ............... C03B 37/018; C23B 25/00; C23F 1/00; C23F 15/00; B24B 1/00
(52) U.S. Cl. ................. 65/392; 65/31; 65/61; 65/386; 250/492.3; 216/80; 216/87; 216/97; 451/57
(58) Field of Search ............... 65/31, 61, 174, 65/176, 386, 392, 17.6, 17.4; 250/492.1, 492.3; 216/9, 80, 87, 97, 99, 94; 451/36, 34, 37, 57

(56) References Cited

U.S. PATENT DOCUMENTS

| 3,328,182 | A | * | 6/1967 | Araujo et al. ............... 501/13 |
| 3,999,865 | A | | 12/1976 | Milam et al. |
| 4,667,101 | A | | 5/1987 | Siekhaus |
| 5,325,230 | A | | 6/1994 | Yamagata et al. |
| 5,472,748 | A | | 12/1995 | Wolfe et al. |
| 5,616,159 | A | * | 4/1997 | Araujo et al. ............... 65/17.4 |
| 5,668,067 | A | * | 9/1997 | Araujo et al. ............... 501/54 |
| 5,735,921 | A | * | 4/1998 | Araujo et al. ............... 65/32.1 |
| 5,879,424 | A | * | 3/1999 | Nishii et al. ............... 65/31 |
| 6,099,389 | A | | 8/2000 | Nichols et al. |
| 6,205,818 | B1 | | 3/2001 | Seward, III |
| 6,262,389 | B1 | * | 7/2001 | Koyama et al. ....... 219/121.71 |
| 6,705,125 | B2 | * | 3/2004 | Peterson et al. ............. 65/392 |
| 2002/0046579 | A1 | * | 4/2002 | Peterson et al. ............. 65/386 |
| 2002/0108400 | A1 | * | 8/2002 | Watanabe et al. ............ 65/61 |

FOREIGN PATENT DOCUMENTS

| EP | 401845 A2 * 12/1990 | ............ C03C/3/06 |
| WO | WO 9807053 A2 * 2/1998 | |

* cited by examiner

*Primary Examiner*—José A. Fortuna
(74) *Attorney, Agent, or Firm*—Eddie E. Scott; Alan H. Thompson

(57) ABSTRACT

A method for reducing the density of sites on the surface of fused silica optics that are prone to the initiation of laser-induced damage, resulting in optics which have far fewer catastrophic defects, and are better capable of resisting optical deterioration upon exposure to a high-power laser beam.

38 Claims, 1 Drawing Sheet

COMBINED ADVANCED FINISHING AND UV LASER CONDITIONING PROCESS FOR PRODUCING DAMAGE RESISTANT OPTICS

CROSS-REFERENCE TO RELATED APPLICATIONS

This application claims the benefit of U.S. Provisional Application No. 60/295,873 filed Jun. 4, 2001, and entitled "Combined Advanced Finishing and UV Laser Conditioning Process for Producing Damage Resistant Optics," which is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of Endeavor

The present invention relates to optics and more particularly to the reduction of damage in optics.

2. State of Technology

A typical means of specifying the laser power handling capability of an optic is to make a determination of its laser damage threshold. Such a threshold is defined as the level of power, and more specifically the fluence, at which any modification of the optic surface or bulk occurs as a result of the passage of the laser pulse. Scientific study of the mechanism and manifestations of laser damage are ongoing. For example, in U.S. Pat. No. 3,999,865, issued Dec. 28, 1976, Milam, et al. describes a system for determining the mechanism responsible for laser-induced damage in a sample which utilizes a procedure of sequentially irradiating a large number of damage sites using a tightly focused laser beam whose intensity is constant in time. A statistical analysis of survival times then yields a determination that damage was due to one of the following mechanisms: (1) linear absorption, (2) nonlinear absorption, (3) absorbing inclusions, (4) mechanical defects, or (5) electron-avalanche breakdown. However, a method for reducing the initiation of damage sites or mitigating the growth of existing damage sites is not provided.

There are many avenues that can be used to increase the laser power handling capability of an optic. These methods include, but are not limited to: (1) fabrication process improvements, (2) use of alternate materials, and (3) post-fabrication treatment or mitigation techniques. Investigations on material properties and process improvements are numerous and many are within the purview of vendors of optical components. In U.S. Pat. No. 6,099,389, issued Aug. 8, 2000, Nichols, et al. describe a method for improving the grinding and polishing of optical parts that minimizes damage during the operation of high power lasers in the ultraviolet range. In U.S. Pat. No. 5,325,230, issued Jun. 28, 1994, Yamagata, et al. describe a method for making optical components from a special composition of high-purity synthetic silica that are able to withstand prolonged exposure to high-power ultraviolet light. Fabrication process improvements, such as those disclosed in U.S. Pat. Nos. 6,099,389 and 5,325,230, relate to semi-finished products that have not been finally polished. The present invention relates to a combined fabrication and post-fabrication treatment technique that significantly increases the lifetime of fused silica optics, such as lenses and windows, for use with high-power ultraviolet laser beams.

Several researchers have previously reported that the damage thresholds of some optical materials for a particular laser could be increased by first illuminating the optical materials with sub-threshold fluences of the same laser. In U.S. Pat. No. 5,472,748, issued Dec. 5, 1995, Wolfe, et al. describe a method for permanently increasing the laser damage threshold of multilayer dielectric coatings by irradiating with a sub-damaging fluence at the operational wavelength of 1060 nm. However, it is not apparent that such a procedure would work for the fused silica component particularly at the ultraviolet wavelength of 355 nm. Similarly, in U.S. Pat. No. 4,667,101, issued May 19, 1987, Siekhaus describes an apparatus for identifying and locating weak spots that could potentially lead to laser-induced damage by subjecting the material to laser intensities that are less than the intensity actually required to produce the damage, and notes that these weak spots may be eliminated by sustained exposure to the laser beam. Siekhaus also notes the possible use of the apparatus for cleansing the optical surface of impurities that could potentially lead to damage. However, because there are many possible mechanisms that lead to damage, as discussed by Milan, et al. in U.S. Pat. No. 3,999,865, it is not apparent that the apparatus described by Siekhaus in U.S. Pat. No. 4,667,101 will be able to significantly reduce the initiation of damage sites when a finished fused silica optic is exposed to a high-power ultraviolet laser.

The method of increasing laser damage threshold by irradiating with a sub-damaging fluence is not a new phenomenon and is commonly known as laser conditioning. The laser wavelength, material identity and material disposition play important roles in determining whether laser conditioning occurs and the degree to which it occurs.

Virtually all references in the literature dealing with laser conditioning consider the conditioning phenomenon using the 1064 nm laser wavelength. This wavelength is in the infrared region of the electromagnetic spectrum, whereas, in our invention, the wavelength of interest is in the ultraviolet portion. The effect of wavelength is a very important parameter in determining whether there can be a conditioning effect. In fact, there is evidence to show that a laser conditioning effect using shorter wavelengths would not be seen. Arenberg and Mordaunt ["Experimental Investigation of the Role of Wavelength in the Laser Conditioning Effect", Nat. Inst. Stand. & Tech. (US.) Spec. Pub. 756, October, 1987 pp. 516–518] had reported that laser conditioning has been observed for an optic for 1064 nm wavelength exposure but that an increase in the laser damage threshold at the shorter 532 nm wavelength had not been observed. One would conclude from this fact that decreasing the wavelength to produce the conditioning effect would not be efficacious.

In U.S. Pat. No. 6,205,818, Mar. 27, 2001, Seward describes a method of rendering fused silica resistant to compaction caused by ultraviolet laser beam irradiation. The method makes the clear distinction between two types of laser damage—those associated with absorption and those associated with compaction. The concern in U.S. Pat. No. 6,205,818 is focussed upon the latter form of damage, with specific concern about the birefringence of the silica optic and the transmitted wavefront alterations produced after use at wavelengths shorter than the one contemplated in the present invention. In the present invention, laser damage concerns are entirely dominated by the former type of laser damage, namely absorption. Catastrophic damage is presumed to be associated with absorbing centers or multiphoton effects associated with defective regions, not with compacted regions. Furthermore, the specific remedy called out in U.S. Pat. No. 6,205,818 suggests an exposure to a laser beam with a fluence higher than the one anticipated under normal operating circumstances. One cannot apply this type of remedy in our case because to do so would quickly result in catastrophic damage to the optic. The treatment methodology in the present invention provides for sub-damage threshold illumination with an ultraviolet laser beam, up to the level of the operating fluence. In the detailed description of the present invention, this method will be shown to be very effective based on the data accompanying the invention description.

The material to be conditioned plays a role in determining whether laser conditioning occurs and the degree to which it occurs. Virtually all of the references in the literature involving laser conditioning focus attention on the treatment of dielectric multilayers, as in U.S. Pat. No. 5,472,748, issued Dec. 5, 1995, by Wolfe, et al. Such multilayers involve stacks of silica and other crystalline materials with a higher index of refraction, such as hafnia, zirconia, titania and the like. Laser damage in these multilayers has been correlated with nodule defects, stemming chiefly from the deposition parameters associated with the high index component. It would be natural to assume then that laser conditioning to improve the laser damage performance of these multilayers would be somehow associated with these nodule defects. However, in bulk fused silica, these defects are not present. Therefore, the main mechanism for laser conditioning cannot exist and it then becomes difficult to imply in an obvious manner that laser conditioning, in any form, can take place for bulk fused silica. Runkel, et al. ["Laser conditioning study of KDP on the Optical Sciences Laser using large area beams", Proc. SPIE-Int. Soc. Opt. Eng. (1998), 3244; Laser-Induced Damage in Optical Materials: 1997, 51–63] discusses laser conditioning for bulk materials, but the reference is only for crystalline potassium dihydrogen phosphate (KDP) crystals and not amorphous fused silica. It remains non-obvious that laser conditioning for bulk fused silica is a viable method of ameliorating laser damage issues in that material.

All previous studies of laser conditioning deal with its effect on the laser damage threshold. A functional or practical measure of the laser power handling capability of an optic should take into consideration the severity of the laser damage and its scope in terms of the concentration of damage sites on the optic surface. For example, small damage sites that do not grow and are limited to a very small fraction of the optic surface would be a damaged optic in the classic, absolute sense but may be acceptable for use in a functional or practical sense. The presentation, "Catastrophic failure of contaminated fused silica optics at 355 nm" by Genin, et al., presented at 2nd Annual International Conference on Solid-State Lasers for Applications to Inertial Confinement Fusion, Paris, France, Oct. 22–25, 1996 describes a study of failure of contaminated fused silica optics at 355 nm.

Methods for reducing the initiation of damage sites that lead to catastrophic failure of the fused silica optics are of critical importance to the high-energy fusion laser community. They are also of critical importance to the multi-billion dollar semiconductor capital equipment market. In the lithography equipment for manufacturing of silicon chips, ultraviolet light in the range of 340–360 nm is primarily used. However, manufacturers would like to use shorter wavelengths such as 193 nm and 248 nm. These wavelengths are becoming common in biomedical devices as well. All of these wavelengths are produced by a series of ultraviolet lasers and images through fused silica optics.

Unfortunately, no suitable methods have been shown to significantly reduce the initiation of damage sites when fused silica optics are exposed to high-power lasers at these wavelengths.

SUMMARY OF THE INVENTION

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a method of processing fused silica optics to reduce damage when said fused silica optics are operated in an environment where they will be exposed to high-power light. An embodiment of the invention provides a method for reducing the density of sites on the surface of fused silica optics that are prone to the initiation of laser-induced damage, resulting in optics which have far fewer catastrophic defects, and are better capable of resisting optical deterioration upon exposure to a high-power laser beam. In one embodiment an optical part is prepared by an advanced polishing process that minimizes subsurface defects and then etched in a clean acid solution to remove any surface contaminants. The optical part is then laser conditioned by exposing it to low fluences below levels that normally lead to catastrophic growth of damage. When the optic is then irradiated at its high fluence design limit, the concentration of catastrophic damage sites that form on the surface of the optic is greatly reduced.

A feature of the invention is to reduce of initiation of catastrophic damage on the surface of fused silica optics, such that the optics can survive prolonged exposure to high-power laser beams having an ultraviolet wavelength of about 360 nm or less.

Another feature of the invention is to substantially improve the resistance to optical deterioration of optical components made of fused silica, such that these optical components can survive prolonged exposure to high-power ultraviolet irradiation. The invention enables such improvement in the optical components with minimum change in the manufacturing process for said optical components.

Another feature of the invention is to substantially improve the resistance to optical deterioration of high-energy laser components made of fused silica for applications to UV/DUV/EUV lithography, especially in semiconductor manufacturing.

There are many commercial lasers that use light wavelengths at 360 nanometers or less. Another feature of the invention is to substantially improve the resistance to optical deterioration of laser components in these devices, since the chief limiting issue for laser materials is their laser damage performance.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
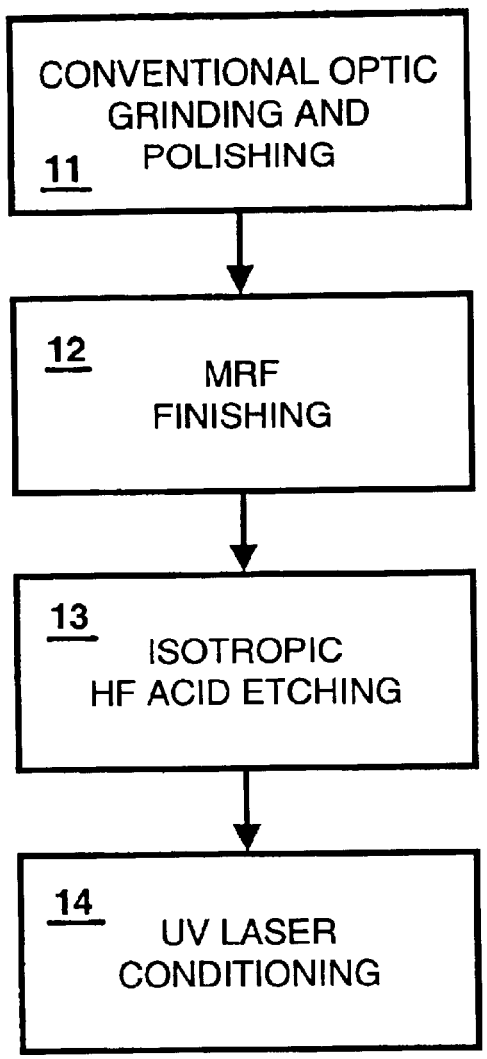
FIG. 1 is a process flowchart that illustrates combined advanced finishing and UV laser conditioning for producing damage resistant optics, wherein the advanced finishing comprises the steps of conventional optic grinding and polishing, followed by magnetorheological finishing, and followed by isotropic HF acid etching.

Referring now to the drawings, to the following detailed information, and to incorporated materials; a detailed description of the invention, including specific embodiments, are described. The description of the specific embodiments, together with the general description of the invention, serve to explain the principles of the invention.

This invention relates to methods for reducing the initiation of laser-induced damage on the surface of fused silica optics in environments where they are exposed to high-power ultraviolet light having a wavelength of about 360 nm or less, e.g. a YAG third harmonic (355 nm, oftentimes referred to as 3ω) laser beam, an excimer laser beam, or some other high-power ultraviolet laser beam such as that intended for the National Ignition Facility. More specifically, the invention relates to methods for reducing the initiation of surface damage sites that lead to catastrophic failure of the fused silica optics. Further, the invention relates to significantly increasing the lifetime of finished products, such as lenses and windows, that have already been finally polished and ready for assembly in an apparatus that uses a high-power ultraviolet laser beam.

The sustained performance of high peak power lasers, such as those used for fusion research, is limited by the damage of optical components that comprise the laser chain. The damage initiates in small size, on the order of tens of micrometers, depending on the peak fluence of the laser. The growth of the damage is exponential in number of shots and can create excessive scatter and beam modulation. Replacing the damaged optics is an option for sustained performance of the laser system, but this option is very expensive. Therefore, a method of reducing or eliminating the number of sites that initiate damage is needed. A method of reducing or eliminating the catastrophic growth of the damage sites is also desirable.

The largest and most powerful lasers designed for achieving thermonuclear ignition will operate with wavelengths ranging from the infrared (1060 nm wavelength) to the ultraviolet (355 nm wavelength). In the final optics stage, the infrared beams will be converted to ultraviolet beams, and then focused to the target. The final optics will be irradiated by a distribution of fluences, peaking at a fluence of about 15 J/cm$^2$, 3 nanosecond pulse duration at 355 nm wavelength. Fluence is defined in the specification and claims for a pulsed laser of a specified wavelength and specified pulse length as the energy per unit area delivered by a single pulse.

Optical components, particularly made of fused silica, are essential for shaping the laser beams and delivering these beams to the target. These optics suffer from weakened areas that are prone to damage at the laser fluences contemplated in the aforementioned laser systems. Damage can occur at the fundamental laser wavelength of 1060 nm and, especially, at the tripled wavelength of 355 nm. There are two options that would enable continued use of the optics. One option is to mitigate the growth of the damage sites before they can create excessive scatter and beam modulation. The other option is to drastically reduce the initiation of damage sites that lead to catastrophic growth.

An object of the invention is to reduce of initiation of catastrophic damage on the surface of fused silica optics, such that the optics can survive prolonged or repeated exposure to high-power laser beams having an ultraviolet (UV) wavelength of about 360 nm or less.

The wavelength of interest ranges from about 360 nm down to about 150 nm, such as would be produced, for example, by a YAG third harmonic (355 nm) laser beam, a YAG fourth harmonic (250 nm) laser beam, a XeF excimer laser beam (351 and 353 nm), a KrF excimer laser beam (248 nm), a XeCl laser beam (308 nm), and an ArF excimer laser beam (193 nm).

High power is defined as the level of power sufficient to initiate damage, or cause the growth of existing damage, on an irradiated optic with a probability of 0.001 percent or greater. For example, if the total number of irradiated laser pulses over a given area of an optic at a certain power is 10$^6$, then the power is high if 10 of those laser pulses cause damage anywhere over that area. Another example, if it is desired that an optic survive exposure for a total number of 10$^6$ laser pulses, then the power is high if the first damage occurs before 10$^5$ pulses. Another example, if an optic is being irradiated over an area of 1000 cm$^2$, then the power is high if the area of initiated damage or grown damage on the optic is 0.01 cm$^2$.

Another object of the invention is to substantially improve the resistance to optical deterioration of optical components made of fused silica, such that these optical components can survive prolonged or repeated exposure to high-power ultraviolet irradiation. The invention enables such improvement in the optical components with minimum change in the manufacturing process for said optical components.

Another object of the invention is to substantially improve the resistance to optical deterioration of high-energy laser components made of fused silica for applications to UV/DUV/EUV lithography, especially in semiconductor manufacturing.

The present invention discloses a method of reducing the initiation of catastrophic damage on the surface of fused silica optics by an advanced polishing process that minimizes subsurface defects and surface contamination, and then conditioning the optic at low fluences below levels that normally lead to catastrophic growth of laser-induced damage. When the optic is then irradiated at its high fluence design limit, the concentration of catastrophic damage sites that form on the surface of the optic is greatly reduced.

The method comprising the present invention contains four steps as shown in the process flowchart in FIG. 1. FIG. 1 is a process flowchart that illustrates combined advanced finishing 11–13 and UV laser conditioning 14 for producing damage resistant optics, wherein the advanced finishing comprises the steps of conventional optic grinding and polishing 11, followed by MRF finishing 12, and followed by isotropic HF acid etching 13.

Conventional grinding 11 (see FIG. 1) includes application of standard optical shop abrasive grinding, such as blanchard or lap grinding, that brings the optics to gross desired dimensional shape. These matte finished optical surfaces are then conventionally lap polished using standard optical shop synthetic-bed or pitch-bed tools containing sequentially smaller sizes of wet abrasive media, such as cerium oxide or zirconium oxide slurries for example, until the desired, or near desired, optical surface quality and figure are attained. These optics possess a polishing layer at their surfaces comprised of an admixture of redeposited optical material and slurry from the conventional polishing steps used to attain the optical surface quality and figure. Below the polishing layer, a subsurface damage layer also exists which is composed of a network of medial and traversing cracks resulting from high normal stresses imparted from the conventional finishing processes used. The subsurface damage is invisible due to the filling of cracks and voids with material from the polishing layer.

Application of a magnetorheological finishing (MRF) step 12 (see FIG. 1) to the optical surfaces removes the polishing layer and the subsurface damage present in surfaces from the conventional grinding and polishing steps. This step is effective at removing said layers due to the small and negligible normal stress loading on the optical surfaces compared to shear stress that is created by the interaction of the tool's magnetic field and the MR fluid through the converging gap between the optic and tool's pole faces. The large shear stress applied to the optical surfaces results in high material removal using selected abrasives with the benefit of little to no crack formation and propagation.

Subsequent application of an etching step 13 (see FIG. 1) to the optical surfaces removes the thin, typically less than 2 micrometers deep, redeposited polishing and subsurface damage layers arising from MRF tool contamination. These layers are mainly composed of iron and polishing media, such as cerium oxide for example, and trace contaminants present in MR fluid. The removal of these layers leaves a new exposed surface free from contamination and little to no subsurface pits and cracks that could interact with a laser beam to induce damage. In one embodiment, the etching step can be conducted, for example, by immersing cleaned optics in an aqueous solution of 20:1 VLSI low particulate grade buffered oxide etch composed of 38% (w/w) ammonium fluoride and 2.45% (w/w) hydrofluoric acid (HF). In other embodiments, different HF solution types and concentrations can be used to define surface etch rates and combined with lithographic masking to define surface topography for imprinting surface patterns such as optical gratings and optical phase modulators.

After finishing, the response of the fused silica optic to high levels of UV laser power is further substantially improved by UV laser conditioning 14 (see FIG. 1). In one embodiment it uses a schedule of repeated exposure of an optic to laser light intensities below that which produces irreversible changes to the optic. Such exposure results in an optic with substantially improved properties with respect to laser power handling capability.

Specimens were prepared by conventionally polishing both sides of the optics using continuous pitch polishing techniques and zirconium oxide (ZrOx) slurry. Some of the optics samples were also subjected to additional magnetorheological finishing (MRF) polishing using standard cerium oxide (CeOx) slurry contained in the iron based MRF fluid media. For these specimens, more than one micrometer of material was removed from one side of the optic using MRF.

The MRF process utilizes magnetic particles and non-magnetic polishing abrasives in either an aqueous or non-aqueous carrier fluid, and a magnetic field to polish materials [A. B. Shorey, S. D. Jacobs, W. I. Kordonski, and R. F. Gans, "Experiments and Observations Regarding the Mechanisms of Glass Removal in Magnetorheological Finishing", Applied Optics, Vol. 40, No. 1, 1 January 2001, pp 20–33]. The standard MR fluid consists of 36-vol. %carbonyl iron (CI) as the magnetic component, 6 vol. % of cerium oxide as the abrasive, with the balance made up of deionized (DI) water and fluid stabilizers. The magnetic CI are spherical particles with a median particle size of 4.5 micrometers. The cerium oxide are lighter, small particles that are the non-magnetic abrasives. The cerium oxide starts with a median size of 3.5 micrometers with a fairly broad distribution. Several particles are significantly smaller than this due to milling of the abrasives during use. Proper manipulation and control of the MR fluid allows MRF to polish successfully a wide variety of materials with commercially viable removal rates. Removal rates obtained with the standard MR fluid vary from approximately 2 micrometers per minute for a hard silica glass such as fused silica.

The optics were cleaned using the most current best known cleaning protocols. This cleaning protocol included a standard buffing with colloidal alumina as one of the cleaning steps. During damage testing of the unetched MRF samples, the sides finished using MRF were mounted towards from the probe laser beam in an attempt to quantify potentially high damage concentrations at the selected laser fluences. In these cases, less than the "true" amount of surface damage was expected to occur due to masking of the optical rear surface by front surface damage. For the etched MRF sample, the side polished using MRF was mounted away from the probe laser beam. This was done in anticipation of obtaining a more accurate representation of the surface damage induced by interaction of the optic with the probe laser beam under improved damage performance conditions.

The etched specimens were prepared by immersing the cleaned optics in an aqueous solution of 20:1 VLSI low particulate grade buffered oxide etch composed of 38% (w/w) ammonium fluoride and 2.45% (w/w) HF for 57 minutes. Using this immersion time and etchant concentration, 2 micrometers of material was removed from both of the optical surfaces. The optic was subsequently washed thoroughly using distilled deionized water, dried, and cleaned using the most current best known cleaning protocols.

After finishing, the response of the fused silica optic to high levels of UV laser power is further substantially improved by UV laser conditioning. In one embodiment it uses a schedule of repeated exposure of an optic to laser light intensities below that which produces irreversible changes to the optic occurs. Such exposure results in an optic with substantially improved properties with respect to laser power handling capability.

The UV laser conditioning process consists of irradiating the surface of the laser optic with laser light at or near 355 nanometers at a fluence level below that which produces any detectable, irreversible change in the surface of said optic. Irradiation continues at successively increasing fluence levels up to the desired operating level of 12–14 $J/cm^2$. Fluence is defined in the specification and claims for a pulsed laser of a specified wavelength and specified pulse length as the energy per unit area delivered by a single pulse. In the drawings and description of this invention, the fluence corresponds to a pulsed laser of a wavelength of 355 nm (sometimes referred to as "3ω") and a pulse length of 3 ns.

Figure 2:
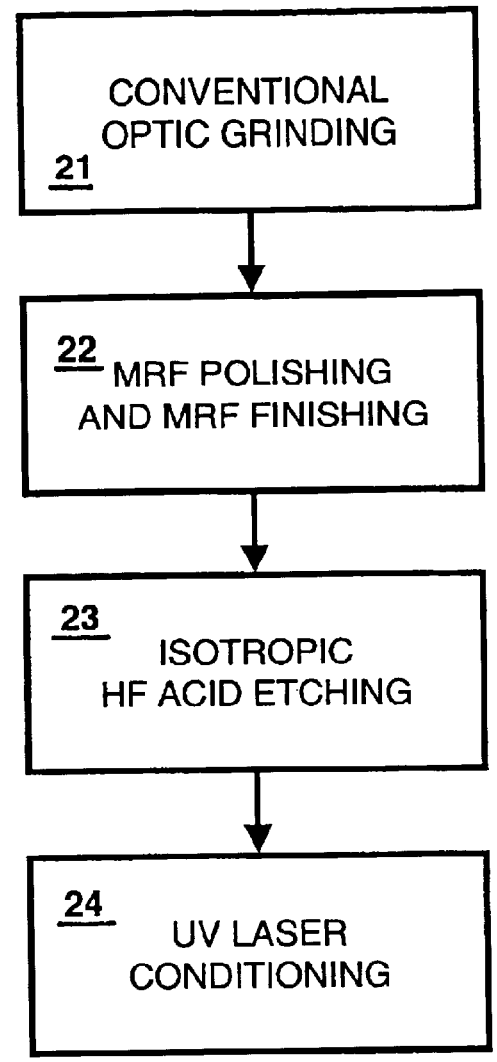
FIG. 2 is a process flowchart that illustrates combined advanced finishing and UV laser conditioning for producing damage resistant optics, wherein the advanced finishing comprises the steps of conventional optic grinding, followed by magnetorheological polishing and magnetorheological finishing, and followed by isotropic HF acid etching.

Another embodiment of the method comprising the present invention contains the four steps as shown in the flowchart in FIG. 2. FIG. 2 is a process flowchart that illustrates combined advanced finishing 21–23 and UV laser conditioning 24 for producing damage resistant optics, wherein the advanced finishing comprises the steps of conventional optic grinding 21, followed by MRF polishing and MRF finishing 22, and followed by isotropic HF acid etching 23. In this embodiment, the MRF tool is used to perform the final polishing of the optical part, in lieu of conventional lap polishing, to bring it to the final desired optical surface quality and figure. The MRF tool can take the ground optical part that has been roughly shaped and finish it to the final optical surface figure without the need for conventional lap polishing. Because the MRF tool is a small tool, it is possible to use it to imprint surface topographical features into optical surfaces, for example, for fabricating continuous phase plates without the need for conventional UV lithography.

A typical means of specifying the laser power handling capability of an optic is to make a determination of its laser damage threshold. Such a threshold is defined as the level of fluence at which any modification of the optic surface or bulk occurs as a result of the passage of the laser pulse. There are four main types of illumination sequences that are used to determine laser damage thresholds. These are referred to by those skilled in the art as 1-on-1, S-on-1, N-on-1 and R-on-1 damage test types. The 1-on-1 test sequence irradiates a site with only one laser shot. The S-on-1 test sequence irradiates a site with several hundred shots at an equal fluence. The N-on-1 test sequence increments the fluence on a site in s step like manner, with a significant time period between each step. The R-on-1 test slowly increments the fluence, in a ramped manner, on a single site over several hundred shots. Both the S-on-1 and R-on-1 tests are done with only 100 ms between each laser pulse. All previous studies of laser conditioning deal with its effect on the laser damage threshold as measured by one of these four types of illumination sequences. In these tests, the many individual test sites are well separated. A curve of cumulative damage probability versus laser fluence is found from the ratio of the number of sites that damage below a certain fluence to the total number of test sites. A laser beam with a diameter of about 1 mm is typically used. Because each test site is only as big as the laser beam diameter, these tests can be done with small optics samples and are very quick for quickly screening the effectiveness of any process for improving the optic. However, these tests sample only a very small fraction of the area of the optic, and appreciable damage information can be obtained only at fluences much higher than those appropriate for large optics under realistic operating conditions.

A functional or practical measure of the laser power handling capability of an optic should take into consideration the severity of the laser damage and its scope in terms of the concentration of damage sites on the optic surface. The preferred procedure for characterizing the laser power handling capability of a large optic is to measure the curve of damage concentration versus fluence. The damage concentration is the ratio of the number of damage sites produced to the area irradiated at a fixed fluence. A relatively much larger area of the optic has to be tested to get an accurate count of the damage concentration at each fluence. Such a large area can be tested by using a laser beam with a large beam diameter, or by raster scanning a small-diameter laser beam over a large area of the optic.

Damage testing was conducted using a frequency tripled Spectra-Physics Nd:YAG laser operating at 355 nm with a 7.5 nsec temporal system pulse width. Peak laser fluence was determined using the peak fluence measured for a Gaussian shaped beam spot scaled from the system temporal pulse width to an equivalent 3-nsec wide pulse by $\tau^{1/2}$. Area scans were conducted with raster step sizes corresponding to the measured Gaussian width at 50% of the peak intensity value. The peak probe fluence was held within +/−5% of target via computer control of the laser system's energy attenuator. Damage detection and quantification was accomplished by side lighting the optic with white light. The area of optic being damage tested was then imaged onto a scanning linear CCD mega-pixel array. This diagnostic enabled a digital micrograph to be generated of the area under test that highlighted defects within the bulk and on the optic surface with a resolution of 80 micrometers per pixel and 10 micrometer sensitivity. The digital micrograph was subsequently analyzed and defects identified via threshold image processing and counting techniques.

The results of large area damage testing conducted on ZrOx-finished specimens are shown in Table I.

Note that both etching alone and 3ω laser conditioning alone reduces the damage initiation compared to the unetched and unconditioned ZrOx finished sample. The improvement is most pronounced at lower laser fluences of 10 J/cm$^2$ and lower. At 10 J/cm$^2$, a factor of 40 reduction in damage initiation is achieved with 3ω laser conditioning. At 12 J/cm$^2$, a factor of 3–4 reduction in damage initiation is achieved with 3ω laser conditioning. Etching two micrometers from the surfaces of the ZrOx finished optic improves damage performance on the unconditioned sample to a state equivalent to 3ω laser conditioning of unetched ZrOx finished parts at 14 J/cm$^2$. At 14 J/cm$^2$, the 3ω laser conditioned etched ZrOx finished sample shows another factor of 10 reduction in damage initiation compared to either the etched-only or the 3ω laser conditioned only sample. It is clear that there is a synergistic effect in combining 3ω laser conditioning with etching.

TABLE I

Large area damage test results for ZrOx finished fused silica optics. Laser wavelength = 355 nm; fluence scaled to 3 ns; 50% beam overlap.

| Sample | Fluence (J/cm$^2$) | Area Tested (cm$^2$) | Damage Sites | Raw Damage Density (sites/cm$^2$) |
|---|---|---|---|---|
| ZrOx | 10 | 50 | 16 | 0.320 |
|  | 12 | 20 | 20 | 1.000 |
| ZrOx with 3ω Conditioning | 10 | 40 | 1 | 0.025 |
|  | 12 | 40 | 11 | 0.275 |
|  | 14 | 40 | 41 | 1.025 |
| Etched ZrOx | 12 | 17 | 13 | 0.765 |
|  | 14 | 20 | 25 | 1.250 |
| Etched ZrOx with 3ω Conditioning | 10 | 130 | 0 | 0.000 |
|  | 12 | 130 | 3 | 0.023 |
|  | 14 | 130 | 14 | 0.108 |

Large testing on the ZrOx finished parts yields damage concentrations comparable to optics that have been finished using similar process conditions or that have been CeOx polished and HF etched. The unetched and unconditioned ZrOx finished part exhibits damage performance consistent with other optics polished with CeOx and HF acid etched to remove CeOX contained in the surface re-deposition/subsurface damage layers. Etching appears to be successful in removing or minimizing this contamination and its effects. The 3ω laser conditioning process further improves the damage resistance of the etched ZrOx polished optic.

The results of large area damage testing conducted on MRF-finished specimens are shown in Table II.

Significant damage concentrations are observed on the unetched MRF finished optics when tested under both unconditioned and 3ω laser conditioned protocols. The unetched/unconditioned MRF optic possesses unacceptable damage concentration. Damage is even more severe during/after 3ω laser conditioning, since a large number of catastrophic damage sites initiate even at low levels of fluence. As the MRF surfaces on these parts were positioned as the optical input surfaces with respect to the laser probe beam, these damage concentrations do not truly indicate the largest impact of the surface conditions upon the optics' damage characteristics. Positioning the MRF surfaces as the optical output surfaces would increase the damage concentration values. As such, damage testing was not conducted at higher fluences due to the risk of catastrophic failure. The poor performance of the unetched MRF optics can most likely be attributed to the iron and CeOx media used by the MRF tool during finishing. These materials have a high probability of combining with, or being present in, the optic surfaces as thin films or particulate inclusions in the surface redeposition or subsurface damage layers.

TABLE II

Large area damage test results for MRF finished fused silica optics. Laser wavelength = 355 nm; fluence scaled to 3 ns; 50% beam overlap.

| Sample | Fluence (J/cm$^2$) | Area Tested (cm$^2$) | Damage Sites | Raw Damage Density (sites/cm$^2$) |
|---|---|---|---|---|
| MRF | 10 | 50 | 28 | 0.560 |
|  | 12 | 20 | 228 | 11.400 |
| MRF with 3ω Conditioning | 10 | 40 | 268 | 6.700 |
| Etched MRF | 12 | 32 | 2 | 0.063 |
|  | 14 | 16 | 17 | 1.063 |
| Etched MRF with 3ω Conditioning | 10 | 120 | 0 | 0.000 |
|  | 12 | 120 | 1 | 0.008 |
|  | 14 | 120 | 2 | 0.017 |

Etching two micrometers from the surfaces of the MRF polished specimen yields significant improvement in damage performance to the extent that it allows damage concentration determination at the high fluence of 14 J/cm$^2$. Testing of the etched and unconditioned MRF finished optic results in damage performance equivalent to that observed for the etched and unconditioned ZrOx finished part and the unetched and 3ω laser conditioned ZrOx finished part at 14 J/cm$^2$. Combining the etching process with 3ω laser conditioning yields damage performance superior to that observed to date on any fused silica optic. 14 J/cm$^2$, the damage concentration observed using this combined protocol is more than a factor of 50 lower than the concentrations observed on the best performing optics. More importantly, damage is not observed at fluences less than 12 J/cm$^2$. This amazing behavior has not been previously observed on any optic tested. The damage test results suggest that etching the surface of the optics removes the tool contamination (iron and/or CeOx) present in a thin re-deposition/subsurface damage layer. The removal of this layer leaves a new exposed surface free from contamination and little to no subsurface pits and cracks that could interact with the laser probe to induce damage. By its very nature, MRF potentially possesses a unique capability in fabrication of optics with low subsurface damage. This could be attributed to small normal stress loading on a glass surface compared to shear stress which is created by the interaction of the tool's magnetic field and the MR fluid through the converging gap between the optic and tool's pole faces. Thus, the shear stress applied to the optic results in high material removal through the use of CeOx abrasives with the benefit of little to no medial crack formation. The damage test data suggests that this is the case and that only slight surface mixing occurs where the iron and CeOx exist on the optic surfaces and can be easily removed with etching. The 3ω laser conditioning process further improves the damage resistance of the etched MRF-polished optic. Conclusions from Test Data The large area damage tests conducted on ZrOx-polished optics supports previous observations that the best known conventional method for polishing optics includes finishing using ZrOx slurry. Additional 3ω laser conditioning applied to the optics also improves optical damage concentration performance over unconditioned parts. HF acid etching can further enhance the optical damage performance when combined with 3ω laser conditioning. Optics processed through the combined etching and 3ω laser conditioning protocol show damage characteristics consistent with the best damage performers observed to date for fused silica optics.

MRF polished optics show superior performance compared to ZrOx polished parts when processed through etching and 3ω laser conditioning protocols. The combination of the two processes has marked effects on damage performance and suggests that improvements may be obtained at up to a factor of 100 at high fluences of 12–14 J/cm$^2$, with even greater effects attainable at fluences of 10 J/cm$^2$ and lower. Combining the etched MRF polished optics with 3ω laser conditioning yields damage performance superior to that observed to date on any fused silica optic.

In this invention, the optical part is first prepared by an advanced polishing process that minimizes subsurface defects. Specific embodiments of advanced finishing processes included ZrOx polishing and MRF polishing. The optical part is then etched in a clean acid solution to remove any surface contaminants that may be present in a thin redeposition/subsurface damage layer. After etching, the optical part is then UV laser conditioned by exposing it to low fluences below levels that normally lead to catastrophic growth of damage. When the optic is then irradiated at its high fluence design limit, the concentration of catastrophic damage sites that form on the surface of the optic is greatly reduced.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method for reducing damage to a fused silica, CaF or silicon optic, comprising the steps of:
   preparing said optic including utilizing a finishing process and minimizing subsurface defects and removing surface contaminants, laser conditioning said optic by exposing it to low fluences, said low fluences being below levels that that are know to lead to the initiation and catastrophic growth of damage sites, and irradiating said optic at its high fluence design limit so that the concentration of damage sites that form on said optic is reduced.

2. The method of claim 1 wherein said finishing process comprises the steps of:

application of grinding and polishing to the surface of said optic to attain the desired, or near desired surface optical shape thereby leaving a polishing layer and subsurface damage, application of a finishing step to the surface of said optics to remove the polishing layer and the subsurface damage left on the optic by the said grinding and polishing, and application of an etching step to the surface of said optic to remove any contamination arising from the said finishing step.

3. The method of claim 2 wherein the said finishing step, and the said grinding and polishing step, are accomplished with the same tool.

4. The method of claim 2 wherein the said grinding is accomplished with optical shop abrasive grinding, said optical shop abrasive grinding including blanchard or lap grinding, that brings the optics to gross desired dimensional shape.

5. The method of claim 2 wherein the said polishing is accomplished by lap polishing using a optic shop synthetic-bed or pitch-bed tools containing sequentially smaller sizes of wet abrasive media, including cerium oxide or zirconium oxide slurries until the desired or near desired optical surface quality and figure are attained.

6. The method of claim 2 wherein the said polishing is adjusted to minimize the polishing layer that is composed of redeposited optical material and slurry.

7. The method of claim 2 wherein the said polishing is adjusted to minimize the subsurface damage layer that is composed of a network of medial and traversing cracks resulting from high normal stresses imparted by the polishing process.

8. The method of claim 2 wherein the said finishing step is accomplished by application of magnetorheological finishing tool to the surface of said optic to remove the polishing layer and the subsurface damage left on said optic by the grinding and polishing processes.

9. The method of claim 8 wherein said magnetorheological finishing tool is used to imprint surface topographical features onto the optical part for fabricating optical components including optical gratings and optical phase modulators.

10. The method of claim 2 wherein the said polishing step is accomplished by application of magnetorheological polishing tool to the surface of said optic to attain the desired, or near desired surface optical figure.

11. The method of claim 10 wherein said magnetorheological polishing tool is used to imprint surface topographical features onto the optical part for fabricating optical components including optical gratings and optical phase modulators.

12. The method of claim 2 wherein the said polishing and finishing steps are accomplished by application of a zirconia-based polishing tool.

13. The method of claim 2 wherein the said finishing step is accomplished using selected abrasives that leave substantially no crack formation and propagation in the optics.

14. The method of claim 2 wherein the said etching step is accomplished using a fluoride solution composed of HF, NH4F and deionized water.

15. The method of claim 14 wherein different HF solution types and concentrations are used to define surface etch rates.

16. The method of claim 2 wherein the said etching is combined with lithographic masking to define surface topography for imprinting surface patterns such as optical gratings and optical phase modulators.

17. The method of claim 2 wherein the said etching step is accomplished using an ion beam.

18. The method of claim 2 wherein the said etching step is accomplished using an electrical discharge plasma containing fluorine atoms dissociated from a class of fluorine-containing compounds such as NF3, CF4 or SF6.

19. The method of claim 2 wherein the said etching step is accomplished using an electrical discharge plasma containing chlorine atoms dissociated from a class of chlorine-containing compounds such as Cl2 or CCl4.

20. The method of claim 1 wherein the said optic is cleaned between the finishing and irradiating steps and wherein said optic is cleaned by washing thoroughly using distilled deionized water, drying, and cleaning with colloidal alumina or zirconia.

21. The method of claim 1 wherein said finishing process comprises the steps of:

application of grinding and polishing to the surface of said optic to attain the near desired surface optical shape, irradiation of the surface of said optic with a CO2 laser to anneal the subsurface damage left on the optics by the said grinding and polishing, application of finishing to the surface of said optic to attain the desired surface optical figure shape, and application of an etching step to the surface of said optic to remove any contamination arising from the said finishing step.

22. The method of claim 1 wherein said laser conditioning comprises the steps of:

irradiating said optic with a conditioning laser beam of about 360 nm wavelength or less, irradiating said optic in successive irradiating steps in ramp-like fashion, and irradiating said optic with successive irradiating steps applied in increasingly higher fluences.

23. The method of claim 22, wherein said successive irradiating steps are continued until the density of catastrophic damage on said optic is reduced by at least a factor of 2.

24. The method of claim 1 wherein said step of irradiating said optic with a conditioning laser beam is conducted with a conditioning laser beam with a wavelength in the range of 360 nm to 150 nm.

25. The method of claim 1 wherein said step of irradiating said optic with a conditioning laser beam is conducted with less fluence than the fluence that could cause more than half the density of catastrophic damage sites in an unconditioned optic.

26. The method of claim 1, wherein the laser used to irradiate the said optic at its high fluence design limit is the same as the laser used for conditioning the said optic at low fluences below levels that lead to the initiation and catastrophic growth of damage.

27. The method of claim 1, wherein the laser used to irradiate the said optic at its high fluence design limit is not the same laser used for conditioning the said optic at low fluences below levels that lead to the initiation and catastrophic growth of damage.

28. The method of claim 27, wherein the laser used to irradiate the said optic at its high fluence design limit has a wavelength at or near the wavelength of the laser used for conditioning the said optic at low fluences below levels that lead to the initiation and catastrophic growth of damage.

29. The method of claim 28, wherein the laser used to irradiate the said optic at its high fluence design limit has a pulse length that is shorter than the pulse length of the laser used for conditioning the said optic at low fluences below levels that lead to the initiation and catastrophic growth of damage.

30. The method of claim 27, wherein the laser used to irradiate the said optic at its high fluence design limit has a pulse length that is longer than the pulse length of the laser used for conditioning the said optic at low fluences below levels that lead to the initiation and catastrophic growth of damage.

31. The method of claim 1 wherein said step of irradiating said optic at its high fluence design limit is conducted with a laser beam with a wavelength in the range of 360 nm to 150 nm.

32. A method for reducing the initiation of catastrophic damage on the surface of a fused silica, CaF or silicon optical part, comprising:
preparing the optical part by a finishing process that minimizes subsurface defects and removes surface contaminants,
laser conditioning the optical part, said laser conditioned comprising exposing the optical part to low fluences below levels that lead to the initiation and catastrophic growth of damage sites, and
irradiating the optical part at its high fluence design limit, wherein the concentration of catastrophic damage sites that form on the surface of the optic is reduced.

33. The method of claim 32 wherein said finishing process comprises the steps of:
application of grinding and polishing to the surface of the optics to attain the desired, or near desired surface optical figure,
application of a finishing step to the surface of the optics to remove the polishing layer and the subsurface damage left on the optics by the said conventional grinding and polishing, and
application of an etching step to the surface of the optics to remove any contamination arising from the said finishing step.

34. The method of claim 33 wherein the said finishing step, and the said grinding and polishing step, are accomplished with the same tool.

35. The method of claim 33 wherein the said conventional grinding is accomplished with a optical shop abrasive grinding, including blanchard or lap grinding, that brings the optics to gross desired dimensional shape.

36. The method of claim 33 wherein the said polishing is accomplished by conventional lap polishing using a optic shop synthetic-bed or pitch-bed tools containing sequentially smaller sizes of wet abrasive media, including cerium oxide or zirconium oxide slurries until the desired or near desired optical surface quality and figure are attained.

37. The method of claim 33 wherein the said polishing is adjusted to minimize the polishing layer that is composed of redeposited optical material and slurry.

38. The method of claim 33 wherein the said polishing is adjusted to minimize the subsurface damage layer that is composed of a network of medial and traversing cracks resulting from high normal stresses imparted by the polishing process.

* * * * *